United States Patent [19]

Grammenopoulos

[11] 4,099,158

[45] Jul. 4, 1978

[54] ELECTRONIC BURGLAR ALARM FOR VEHICLES

[76] Inventor: Efstathios Demetres Grammenopoulos, Rua Dr. Martinico Prado 90, apto 124, Sao Paulo, Brazil

[21] Appl. No.: 796,426

[22] Filed: May 12, 1977

[30] Foreign Application Priority Data

Aug. 2, 1976 [BR] Brazil .................................. 7605037

[51] Int. Cl.² .............................................. B60R 25/10
[52] U.S. Cl. ................................. 340/63; 307/10 AT
[58] Field of Search ............. 340/63, 64; 307/10 AT; 180/114

[56] References Cited

U.S. PATENT DOCUMENTS 3,710,317  1/1973  Colsen et al. .......................... 340/64

Primary Examiner—Alvin H. Waring

[57] ABSTRACT

An electronic burgler alarm for vehicles essentially comprising a pair of controlled diodes and related control circuitry for activating an alarm. In the preferred embodiment, the device is made from solid state components assembled in a unitary package and having four terminals that readily adapt the device for connection, respectively, to the positive side of a battery, to the load or alarm to be activated, to the chassis of the vehicle through a manually set switch, and to the door switch of the vehicle which operates an interior light.

7 Claims, 4 Drawing Figures

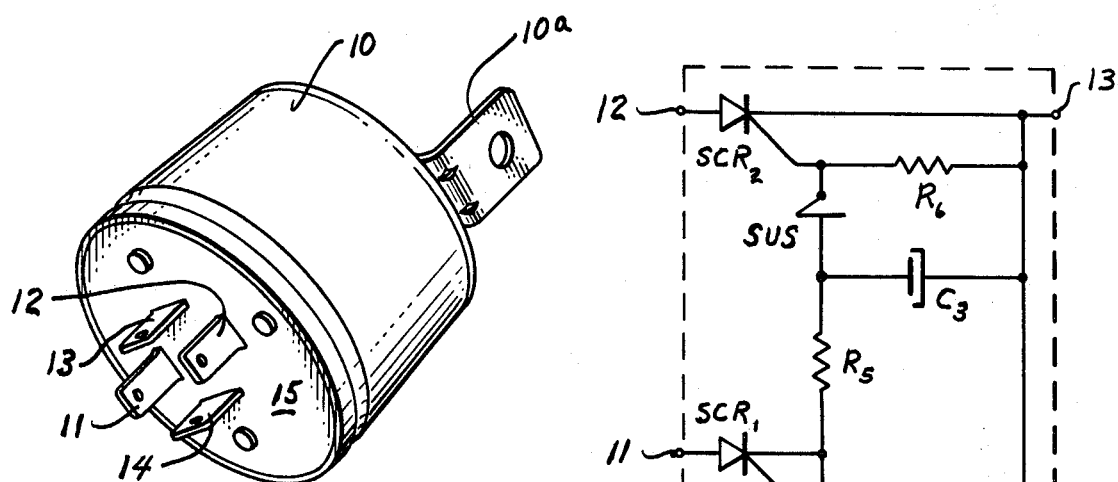
FIG. 1.
FIG. 2.
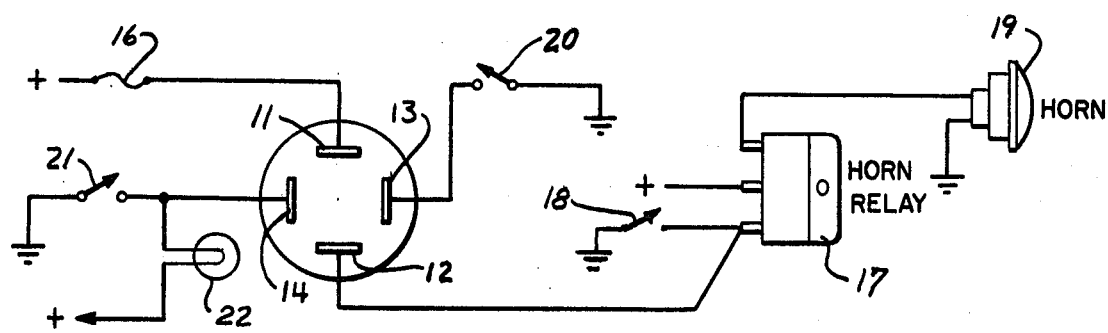
FIG. 3.
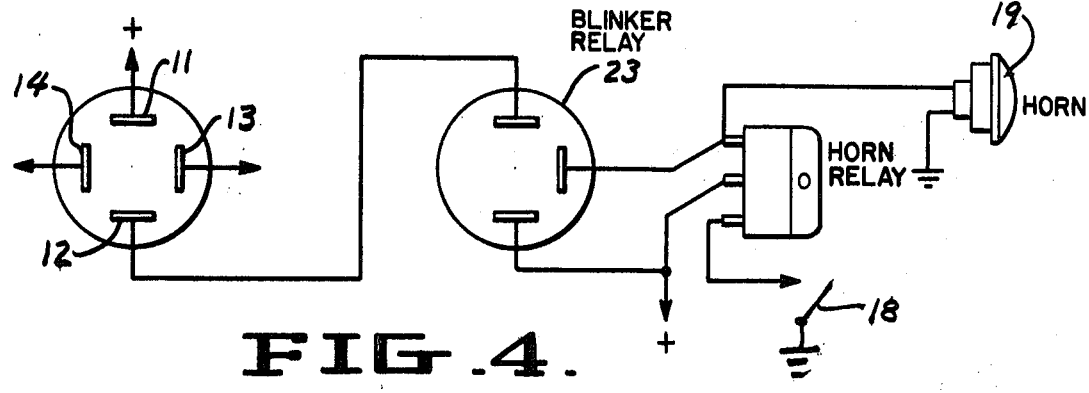
FIG. 4.

ELECTRONIC BURGLAR ALARM FOR VEHICLES

A number of devices have been marketed and are known which provide an alarm when the door of a parked vehicle is opened. These devices, of course, attempt to protect against theft of the vehicles, and many different forms of such devices have been made. Some operate alarms, while others connect to the steering control, operate the ignition to the car or even interrupt the fuel line to the motor. In spite of the large number of such devices and their diverse nature, most suffer either from having excessive structural complexity or from being very crude and undependable. The more complex devices are also usually more costly and are susceptible to mismanufacture or malfunctions. On the other hand, the less complicated devices are often easily detected and disarmed, thereby providing inadequate protection of the vehicle.

It is a principal object of the present invention to provide an electronic device that may be incorporated with standard wiring for vehicles and provide an alarm system that is both practical and dependable.

In general, the invention comprises an electronic circuit including a pair of controlled diodes, which operate an alarm that is energized by the battery of the vehicle. In one preferred embodiment, the device is used in conjunction with a door switch and a manually set secret control switch hidden inside the vehicle. An unlawful entry of the vehicle (requiring the opening of the vehicle door) triggers an alarm, such as the horn or the headlights of the car unless a secret control switch is turned off.

Various objects of this invention will become apparent in view of the following detailed description.

In the drawings, forming a part of this application and in which like parts are identified by like reference numerals throughout the same:

FIG. 1 is a perspective view of a preferred physical arrangement and embodiment of the invention in a solid state circuit device;

FIG. 2 is a schematic diagram of the electronic circuitry utilized by the preferred embodiment;

FIG. 3 is a schematic and diagrammatic view of a preferred form of mounting the device to activate the horn of a vehicle; and FIG. 4 is a second schematic and diagrammatic view of another form of connection to activate the horn.

The present invention essentially comprises a solid state circuit including a pair of controlled diodes and related control circuitry that may be unitized in a relatively small package, as shown in FIG. 1. It will be readily apparent that the device as a whole may be enclosed in a small casing 10 and having a set of four terminals 11, 12, 13 and 14 which project from an insulating base 15 and provide ready means for connecting the device to standard circuitry of the car. One terminal connects to the battery of the vehicle, another to the load or alarm device, a third to the chassis of the vehicle and the fourth to a door switch — all in the manner hereinafter described. A flange 10a provides means for attaching casing 10 to the underside of the dashboard as by means of a screw.

Referring to FIG. 2, this invention essentially comprises a pair of controlled diodes $SCR_1$ and $SCR_2$, the anode of $SCR_1$ connecting to the terminal 11 and the anode of $SCR_2$ connecting to terminal 12; and a pair of control circuits are provided for operating the controlled diodes. The control circuit for diode $SCR_1$ provides means for setting and triggering the alarm and comprises a set of three resistances $R_2$, $R_3$ and $R_4$ connected in series with a capacitor means (consisting of capacitors $C_1$ and $C_2$) between terminals 13 and 14. A diode DI is connected in parallel with the set of three resistances, and a fourth resistance $R_1$ is connected between terminals 13 and 14 in parallel with the set of three resistances and the capacitor means.

The control circuit for $SCR_2$ incorporates a time delay that triggers $SCR_2$ six to ten seconds following initial conduction of $SCR_1$. This control circuit comprises a resistance $R_5$ and a silicon unilateral switch SUS, connected in series intermediate the cathode of $SCR_1$ and the gate of controlled diode $SCR_2$. A second resistance $R_6$ connects the gate of $SCR_2$ with terminal 13; and a capacitor $C_3$ connects terminal 13 to a point between unilateral switch SUS and resistance $R_5$.

In a preferred application, the alarm detection circuitry is connected as shown in FIG. 3. Terminal 11 connects to the positive side of a battery through a fuse 16; terminal 12 connects to the negative side of a horn relay 17 (which is energized by closure of a horn switch 18 that in turn energizes a horn 19 in the usual manner); terminal 13 connects with the chassis of the vehicle through a specially provided switch 20, which may be hidden or key operated; and terminal 14 connects to a standard light circuit comprising a car door switch 21 and the switch operated light 22. It is to be noted that terminal 14 connects to the negative side of the door operated light 22 and takes on the charge of the battery through light 22 when switch 21 is opened.

The alarm system is initially conditioned so that neither of the controlled diodes $SCR_1$ and $SCR_2$ is conductive at a time that switch 20 is closed and switch 21 is opened. This is accomplished by initially loading capacitors $C_1$ and $C_2$ in the following manner: The owner of the vehicle conditions the alarm system by first opening the vehicle door controlling switch 21 (thereby closing switch 21) and then closing the secret switch 20. The driver immediately exits from the vehicle closing the door behind him, causing switch 21 to open. Capacitors $C_1$ and $C_2$ are thereby charged or loaded through light 22, diode DI (which provides a short circuit of resistors $R_2$, $R_3$ and $R_4$) terminal 13 and secret switch 20.

It should be observed that switch 20 should never be connected or closed prior to the initial opening of door switch 21, since, if the sequence is reversed, the alarm circuit will be triggered. This follows since the initial closing of switch 20 with switch 21 open loads the capacitors $C_1$ and $C_2$, and the subsequent opening of the door (closing switch 21) immediately discharges the capacitors when the driver leaves the vehicle. The act of discharging capacitors $C_1$ and $C_2$ sets off the alarm sequence.

In operation of the alarm circuitry, and assuming that the capacitors $C_1$ and $C_2$ have been properly charged in the manner described, opening the car door closes switch 21, discharging capacitors $C_1$ and $C_2$ through resistances $R_2$, $R_3$ and $R_4$. This discharge produces a difference of potential at the ends of resistor $R_3$ to which the cathode and gate of $SCR_1$ are connected, respectively. The selected values of capacitors $C_1$ and $C_2$ are sufficient to trigger $SCR_1$ which then begins to conduct through a parallel circuit comprising resistors $R_3$ and $R_4$ on one side and resistor $R_2$ with diode DI on the other side.

Once $SCR_1$ is activated, it continues to conduct even after the door of the vehicle is closed, which would cause switch 21 to open. Moreover, while $SCR_1$ is conductive, there is a difference in potential between the cathode of $SCR_1$ and the terminal 13. This produces a loading of capacitor $C_3$ through the resistor $R_5$. When capacitors $C_3$ becomes loaded to a preselected voltage, unilateral silicon switch SUS is closed, triggering the second controlled diode $SCR_2$, thereby energizing horn relay 17 through terminal 12, $SCR_2$, terminal 13 and switch 20.

It will be readily apparent that the combined values of $C_3$ and $R_5$ determine the time required to load the capacitor, and those values are selected to provide adequate time (6 to 10 seconds) for the vehicle owner to enter the vehicle and open switch 20, thus interrupting the alarm process. It should be further observed that the door operated light 22 is an important part of the alarm circuit. If the bulb is burned out, it must be replaced immediately for otherwise capacitors $C_1$ and $C_2$ cannot be loaded in the manner contemplated.

Referring to FIG. 4 of the drawings, there is shown a modified arrangement utilizing the invention in conjunction with a transistorized blinker relay 23. Such relays are well known and, when triggered, furnish an intermittent operation of the horn 19. This circuit modification has the advantage of providing a more characteristic alarm signal which, at the same time, saves on battery energy.

It will be evident that the invention can be utilized with various load devices other than a horn. More particularly, numerous design modifications and changes may be resorted to without departing from the spirit of the invention or the scope of the attached claims, and each of such modifications and changes is contemplated. As an example and with a suitable relay, one could intermittently turn on the headlights of the vehicle or operate a relay to bypass the ignition of the car, etc.

What is claimed is:

1. A solid state control unit that is adapted for use in an alarm system comprising a switch that is operated upon entry, a load connected to a voltage source and a security switch, said unit comprising:
    a pair of first and second controlled diodes ($SCR_1$ and $SCR_2$);
    a first control circuit connected to the gate of said first controlled diode ($SCR_1$) and including means for triggering said first controlled diode to conduct a current through the security switch, and a second control circuit connected to the gate of said second controlled diode ($SCR_2$) and including delay means permitting an interruption of said first and second control circuits by opening the secutiry switch prior to triggering of said second controlled diode; the cathode of said first controlled diode being connected to the second control circuit to energize said second control circuit when said first controlled diode is conductive.

2. A solid state control unit that is readily adapted for connection and use with a switch that is operated upon entry, a load connected to a voltage source and a security switch; said unit comprising:
    a pair of first and second controlled diodes;
    a pair of first and second control circuits, said first control circuit connected to the gate of the first controlled diode and including means for triggering said first controlled diode to conduct a current through the security switch, said second control circuit connected to the gate of the second controlled diode and including delay means permitting an interruption of said first and second control circuits by opening the security switch prior to triggering of said second controlled diode, the cathode of the first diode being connected to the second control circuit and energizing said second control circuit when the first diode is conductive;
    a first terminal connected to the anode of said first diode and adapted for connection to a voltage source;
    a second terminal connected to the anode of said second diode and adapted for connection to a load;
    a third terminal connected to the cathode of said second diode and adapted for connection to a ground through a security switch; and
    a fourth terminal connected to the control circuit of said first diode and adapted for connection to a switch that is closed to ground upon entry.

3. The control unit of claim 2, said second control circuit comprising a unilateral switch and a first resistance connected intermediate the cathode of said first diode and the gate of said second diode, a second resistance connected between the gate of said second diode and said third terminal, and a capacitor connected to said third terminal in parallel with said unilateral switch and said third resistance.

4. The control unit of claim 2, the control circuit for said first diode comprising a set of three resistances connected in series with a capacitor means between said third terminal and said fourth terminal, a diode connected in parallel with said set of three resistances, and a fourth resistance connected between said third terminal and said fourth terminal in parallel with said set of three resistances and said capacitor means.

5. An electronic detection device and control for use with a manually set switch in vehicles having a switch operated upon entry, a battery and an alarm or load, said device comprising two controlled diodes ($SCR_1$ and $SCR_2$), the anode of one diode ($SCR_1$) connected through a first terminal to the positive side of the vehicle battery, the anode of the second diode ($SCR_2$) connected through a second terminal to the load, the cathode of said first and second diodes being connected through a third terminal and the manually set switch to ground, a first control circuit for triggering said first diode and connecting the gate of said first diode to a switch that is closed to ground upon entry, and a second control circuit including delay means connecting the cathode of said first diode to the gate of said second diode.

6. The electronic detection device and control of claim 5, said first control circuit being activated in response to closure of a door switch, said control circuit being connected to the negative side of said door switch through a fourth terminal and including a parallel connection interconnecting said fourth terminal and third terminal, one side of said parallel connection having a resistor ($R_1$) and the other side of said parallel connection having a pair of capacitors ($C_1$, $C_2$) and three resistors ($R_2$, $R_3$ and $R_4$); said circuit further comprising a diode (DI) connected across said three resistors, means connecting two of said three resistors ($R_3$ and $R_4$) in parallel with a resistor ($R_5$).

7. The electronic detection device and control of claim 5, said second control circuit comprising a silicon unilateral switch (SUS) and a resistor ($R_6$); and a capacitor ($C_3$) connected to said third terminal in parallel with said silicon unilateral switch and resistor ($R_6$).

* * * * *